United States Patent [19]

Schack et al.

[11] Patent Number: 4,462,975

[45] Date of Patent: Jul. 31, 1984

[54] SYNTHESIS OF PENTAFLUOROTELLURIUM HYPOFLUORITE

[75] Inventors: Carl J. Schack, Chatsworth; William W. Wilson, Simi Valley; Karl O. Christe, Calabasas, all of Calif.

[73] Assignee: The United States of America as represented by the Secretary of the Air Force, Washington, D.C.

[21] Appl. No.: 478,581

[22] Filed: Mar. 24, 1983

[51] Int. Cl.$^3$ ............................................. C01B 11/24
[52] U.S. Cl. ..................................... 423/473; 423/508
[58] Field of Search ............... 423/473, 508, 579, 467, 423/472, 641, 642, 643, 512

[56] References Cited

U.S. PATENT DOCUMENTS

| | | | |
|---|---|---|---|
| 4,216,338 | 8/1980 | Schack et al. | 560/227 |
| 4,222,968 | 9/1980 | Schack et al. | 260/653 |
| 4,329,330 | 5/1982 | Christe et al. | 423/473 |

OTHER PUBLICATIONS

J. Fluorine Chem., 7, 192, 193, 195, (1973).
Mathers et al., Inorg. Syn., 3, 145, (1950).
Seppelt et al., Inorg. Chem., 12, 2727–2730, (1973).
Christe et al., Inorg. Chem., 20, 2104–2114, (1981).
Dudley et al., J. Am. Chem. Soc., 78, (290–292, (1956).
U.S. Pat. Appl. "Pentafluorotellurium Oxides", Schack et al. identified as AF Inv. No. 15,528, filed of even date herewith.

*Primary Examiner*—Earl C. Thomas
*Assistant Examiner*—Jeffrey E. Russel
*Attorney, Agent, or Firm*—Donald J. Singer; William J. O'Brien

[57] ABSTRACT

The present invention concerns itself with a method for synthesizing hypofluorite compounds by utilizing fluorine fluorosulfate as a fluorinating agent and to a novel pentafluorotellurium hypofluorite compound prepared thereby.

4 Claims, No Drawings

SYNTHESIS OF PENTAFLUOROTELLURIUM HYPOFLUORITE

STATEMENT OF GOVERNMENT INTEREST

The invention described herein may be manufactured and used by or for the Government for governmental purposes without the payment of any royalty thereon.

BACKGROUND OF THE INVENTION

This invention relates to hypofluorite compounds and to a novel method for their preparation. In a more particular aspect, this invention concerns itself with a novel route for effecting the synthesis of pentafluorotellurium hypofluorite (TeF$_5$OF) using fluorine fluorosulfate as a reaction component.

Hypofluorite compounds are well known and find utility for a wide variety of industrial applications. They are particularly useful as fluorinating agents for introducing fluorine atoms into another compound, and as intermediates in synthetic reactions. At the present time, however, there is no simple and convenient process for producing these compounds. Until recently, the number of elements known to form hypofluorites was limited to the nonmetal main group elements of hydrogen, carbon, nitrogen, oxygen, sulfur, selenium, fluorine and chlorine.

Generally, the method used heretofore for the synthesis of these hypofluorites involved the fluorination of the corresponding hydroxyl compounds or their metal salts with elemental fluorine. An attempt was made by Seppelt et al, Inorg. Chem. 1973, 12, 2727, to apply this method to the synthesis of the hitherto unknown TeF$_5$OF. The attempt was unsuccessful. An analogous method, however, proved fruitful in synthesizing TeF$_5$OCl which led to the conclusion that TeF$_5$OF is unstable or actually nonexistant. Additionally, further research efforts, as reported by Christe et al, Inorg. Chem., 1981, 20, 2104, proved to be successful in synthesizing a stable iodine hypofluorite with the observation that hypofluorites are generally more stable than the other hypohalites and the suggestion that TeF$_5$OF should exist and should also be stable.

In line with the observations noted above, additional experimental efforts proved successful and a novel method for synthesizing TeF$_5$OF was discovered. It was found that the hitherto unknown TeF$_5$OF compound could be produced in stable form and in relatively high yield by a process which provided for the use of fluorine fluorosulfate as the fluorinating agent.

SUMMARY OF THE INVENTION

The present invention concerns itself with a novel method for synthesizing hypofluorites by utilizing fluorine fluorosulfate as a fluorinating agent. The method of this invention proved successful in synthesizing in high yield the novel compound, pentafluorotellurium hypofluorite. Synthesis is achieved by effecting a reaction between CsTeF$_5$O and FOSO$_2$F at relatively low temperatures.

Accordingly, the primary object of this invention is to provide a novel method for synthesizing hypofluorite compounds.

Another object of this invention is to provide a method for synthesizing hypofluorite compounds that utilizes fluorine fluorosulfate as a fluorinating agent.

Still another object of this invention is to provide a method for synthesizing the novel compound, pentafluorotellurium hypofluorite.

The above and still other objects and advantages of the present invention will become more readily apparent upon consideration of the following detailed description thereof.

DESCRIPTION OF THE PREFERRED EMBODIMENTS

Pursuant to the above-defined objects, the present invention is brought into effect by accomplishing a reaction between CsTeF$_5$O and FOSO$_2$F within a closed environment at temperatures ranging from about $-10°$ to $-45°$ C. The known methods for preparing hypofluorites are quite limited and attempts at using these previously known methods for producing the hitherto unknown TeF$_5$OF have not been successful. For example, the fluorination of either CsTeF$_5$O or KTeF$_5$O with F$_2$ at $-45°$ to $-10°$ C. resulted only in the formation of TeF$_6$. However, with the present invention, it was found that a fairly high yield synthesis of TeF$_5$OF could be accomplished by reacting CsTeF$_5$O with FOSO$_2$F at temperatures ranging from about $-10°$ to $-45°$ C. This reaction is illustrated by the following general equation:

$$CsTeF_5O + FOSO_2F \rightarrow CsSO_3F + TeF_5OF \qquad (1)$$

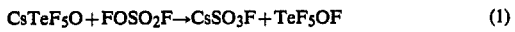

This novel reaction represents a new synthetic route to the preparation of hypofluorite compounds. Based on the general usefulness of the analogous ClOSO$_2$F reagent for the syntheses of hypochlorites, it would appear that FOSO$_2$F will become a similarly useful, versatile and general reagent for the synthesis of hypofluorite compounds.

When the synthesis of TeF$_5$OF from CsTeF$_5$O and FOSO$_2$F was carried out above $-45°$ C., the amount of TeF$_6$ by-product sharply increased. For example, at $-10°$ C. and with a reaction time of 7 days, the TeF$_6$ to TeF$_5$OF ratio in the product increased to 1:1. The use of an excess of CsTeF$_5$O in this reaction was found advantageous for the product purification since it eliminated the need for separating TeF$_5$OF from FOSO$_2$F.

The reaction scheme for synthesizing the novel TeF$_5$OF compound of this invention is further illustrated with greater specificity by Example I which follows.

EXAMPLE I

A 30 ml stainless steel Hoke cylinder was loaded with CsTeF$_5$O (3.42 mmol) in the glove box. After evacuation and cooling of the cylinder to $-196°$ C., FOSO$_2$F (2.79 mmol) was added from the vacuum line. The closed cylinder was slowly warmed to $-78°$ C. in a liquid nitrogen-CO$_2$ slush bath and finally kept at $-45°$ C. for 9d. Upon recooling to $-196°$ C. about 4-5 cm$^3$ of noncondensable gas was observed to be present. This was pumped away and the condensable products were separated by fractional condensation in a series of U-traps cooled at $-78°$, $-126°$, and $-196°$ C. The $-78°$ C. fraction was TeF$_5$OH (0.19 mmol) while the $-196°$ C. fraction was TeF$_6$ (0.49 mmol).

A white solid was retained at $-126°$ C. which changed to a colorless glass and melted, over a range of a few degrees, near $-80°$ C. to a clear, colorless liquid. This material was identified as TeF$_5$OF (1.91 mmol, 68% yield) based on its vapor density molecular weight; found, 256.2; calc., 257.6 g/mol. Further identification was based on its spectroscopic properties and on the preparation of derivatives. The observed weight loss of the solid (0.375 g) agreed well with that calculated (0.389 g) for the conversion of 2.79 mmol $CsTeF_5O$ to $CsSO_3F$. Vapor pressure-temperature data of $TeF_5OF$ were measured: T°C., Pmm; −79.3, 16; −64.2, 45; −57.6, 63; −46.9, 108; −32.5, 210; −23.0, 312.

The $TeF_5OF$ compound of Example I is colorless as a gas and liquid. Its vapor pressure-temperature relationship for the range −79° to −23° C. is given by the equation $$\log P_{mm} = 6.9022 - 1101.2/T°K.$$

The extrapolated boiling point is 0.6° C. The derived heat of vaporization is $H_{vap} = 5039$ cal mol$^{-1}$ and the Trouton constant is 18.4 indicating little or no association in the liquid phase. Vapor density measurements showed that in the gas phase the compound is also not associated. A sharp melting point for $TeF_5OF$ was not observed because the samples showed a tendency to form a glass near −80° C. The compound appears to be completely stable at ambient temperature and has been stored in stainless steel cylinders for more than four months without any sign of decomposition.

The mass spectrum of $TeF_5OF$ is listed in Table I together with the spectra of $TeF_5OCl$ and $TeF_5OH$ which were measured for comparison. All of the listed fragments showed the characteristic tellurium isotope pattern and therefore the individual m/e listings were omitted for simplicity. The spectra of all three compounds show weak parent ions and $TeF_3^+$ as the base peak.

TABLE I

MASS SPECTRUM OF $TeF_5OF$ COMPARED TO THOSE OF $TeF_5OCl$ AND $TeF_5OH$

| $TeF_5OF$ | | $TeF_5OCl$ | | $TeF_5OH$ | |
|---|---|---|---|---|---|
| assignt | intens | assignt | intens | assignt | intens |
| $TeF_5OF^+$ | vw | $TeF_5OCl^+$ | vvw | $TeF_5OH^+$ | w |
| $TeF_4OF^+$ | vvw | $TeF_4OCl^+$ | vw | $TeF_4OH^+$ | vw |
| $TeF_5O^+$ | | | | | |
| $TeF_5^+$ | s | $TeF_5^+$ | s | $TeF_5^+$ | vs |
| $TeF_4^+$ | w | $TeF_4^+$ | vw | $TeF_4^+$ | w |
| $TeF_3O^+$ | m | $TeF_3O^+$ | ms | $TeF_3O^+$ | s |
| $TeF_3^+$ | vs | $TeF_3^+$ | vs | $TeF_3^+$ | vs |
| $TeF_2^+$ | m | $TeF_2^+$ | m | $TeF_2^+$ | m |
| $TeFO^+$ | vw | $TeFO^+$ | w | $TeFO^+$ | w |
| $TeF^+$ | w | $TeF^+$ | w | $TeF^+$ | w |
| $Te^+$ | w | $Te^+$ | w | $Te^+$ | w |

The infrared spectra of gaseous and of neon matrix isolated $TeF_5OF$ and the Raman spectra of liquid and solid $TeF_5OF$ were recorded and the observed frequencies are summarized in Table II.

TABLE II

VIBRATIONAL SPECTRA OF $TeF_5OF$
obsd freq, cm$^{-1}$, and rel intens$^a$

| | IR | Raman | | |
|---|---|---|---|---|
| gas | Ne matrix | liquid −55° C. | solid −110° C. | assignment$^b$ |
| 1800 vw | | | | $2\nu_{12}$ |
| 1449 vw | | | | $2\nu_1$ |
| 1403 w | | | | $\nu_2 + \nu_8$ |
| 908 vw | | 905(0.4)p | 904(0.8) | $\nu_{12}$ |
| 738 | 738$^c$vs | 738 sh dp | 735 sh | $\nu_8$ |
| | 727 vs | 721(1.1)p | 721(1.3) | $\nu_1$ |
| | 718 vw | | | } impurity? |
| | 709 vw | | | |

TABLE II-continued

VIBRATIONAL SPECTRA OF $TeF_5OF$
obsd freq, cm$^{-1}$, and rel intens$^a$

| | IR | Raman | | |
|---|---|---|---|---|
| gas | Ne matrix | liquid −55° C. | solid −110° C. | assignment$^b$ |
| | 668 vw | 669(10)p | 670(10) | $\nu_2$ |
| | | 660(0.3)dp | 662 sh | $\nu_5$ |
| 616 m | 618 m | 613(3.8)p | 613(4) | $\nu_3$ |
| 324 vs | 327 vs | 325 sh, dp | 325 sh | $\nu_9$ |
| | 318 vs | | 319 sh | $\nu_{10}$ |
| | 308 vw | 309(1.0)dp | 309(1.6) | $\nu_7$ |
| 300 sh | 302 m | 301(0.5)p | 301 sh | $\nu_4$ |
| 280 mw | 278 m | 279(0.2)dp | 279(0.2) | $\nu_{11}$ |
| 241 mw | 239 mw | 240(0.2)p | 240(0.2) | $\nu_{13}$ |
| | | 166(0.1)dp | 167(0.1) | $\nu_{14}$ |

$^a$Uncorrected Raman intensities (peak heights).
$^b$For mode description see Table IV.
$^c$Band shows tellurium isotope fine structure with splittings of about 1.30 cm$^{-1}$ The vibrational spectra of $TeF_5OF$ can be readily assigned as shown in Table III assuming a model with $C_{4v}$ symmetry for the $TeF_5O$ part and $C_s$ symmetry for the TeOF part of the molecule.

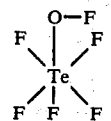

Except for the symmetric out of phase, out of plane $TeF_4$ deformation mode in species $B_1$ which is usually observed for pseudo-octahedral molecules and is inactive under $O_h$ symmetry, all fundamentals expected for the above $C_{-4v}-C_s$ model were observed. Using the well established assignments of $TeF_5Cl$, the assignments (see Table III) are straight forward and show for the two molecules almost identical frequencies for the $TeF_5$ part of the molecules. The weak band observed at about 906 cm$^{-1}$ in both the infrared and Raman spectra is characteristic for the OF stretching vibrations in hypofluorites.

TABLE III

Vibrational Spectra of $TeF_5OF$ and their Assignment Compared to Those of $TeF_5Cl$ obsd freq, cm$^{-1}$, and rel intens$^a$

| assign-ment | approx descrip-tion of mode | $TeF_5Cl$ | | $TeF_5OF$ | |
|---|---|---|---|---|---|
| | | IR (gas) | RA (liquid) | IR (gas, matrix) | RA (liquid) |
| $C_{4v}$ | | | | | |
| $A_1$ $\nu_1$ | $\nu TeF$ | 711 sh,m | 708 (3.1)p | 727 vs | 721 (1.1)p |
| $\nu_2$ | $\nu_s TeF_4$ | 662 vw | 659 (10)p | | 669 (10)p |
| $\nu_3$ | $\nu TeX$ | 411 ms | 413 (7.7)p | 616 m | 613 (3.8)p |
| $\nu_4$ | $\delta_s TeF_4$ | 317 s | 312 (0.8)p | 301 m | 301 (0.5)p |
| $B_1$ $\nu_5$ | $\nu_s TeF_4$ | | 651 (0.8)dp | | 660 (0.3)dp |
| $\nu_6$ | $\delta TeF_4$ | | | | |
| $B_2$ $\nu_7$ | $\delta_{sciss} TeF_4$ | | 302 (0.5)dp | 308 vw | 309 (1.0)dp |
| E $\nu_8$ | $\nu_{as} TeF_4$ | | 726 (0.6)dp | 738 vs | 738 sh, dp |
| $\nu_9$ | $\nu FTeF_4$ | | 327 (0.9)dp | 327 vs | 325 sh, dp |
| $\nu_{10}$ | $\delta XTeF_4$ | | 167 (1.8)dp | 318 vs | (309= 325) |
| $\nu_{11}$ | $\delta_{as} TeF_4$ | | 259 (1.7)dp | 280 mw | 279 (0.2)dp |

TABLE III-continued

Vibrational Spectra of TeF$_5$OF and their Assignment Compared to Those of TeF$_5$Cl

| assignment | approx description of mode | TeF$_5$Cl IR (gas) | TeF$_5$Cl RA (liquid) | TeF$_5$OF IR (gas, matrix) | TeF$_5$OF RA (liquid) |
|---|---|---|---|---|---|
| $C_s$ | | | | | |
| A' $\nu_{12}$ | $\nu$XY | | | 908 vw | 905 (0.4)p |
| A" $\nu_{13}$ | $\delta$TeXY | | | 240 mw | 240 (0.2)p |
| $\nu_{14}$ | $\tau$TeXY | | | | 166 (0.1)dp |

[a] Uncorrected Raman intensities (peak heights).

In preparing and testing the novel hypofluorite compound of this invention, the volatile materials were manipulated in a stainless steel vacuum line equipped with Teflon FEP (a polyperfluoroethylene propylene copolymer) U traps and 316 stainless steel bellows-seal valves and a Heise Bourdon tube-type pressure gauge. Telluric acid was prepared by the literature method of Mathers et al, Inorg. Syn., 1950, 3, 145, and also purchased from Cerac, Inc., and from Pfaltz and Bauer. Fluorosulfuric acid obtained from Allied was used both as received (light brown color) and after distillation to obtain the clear colorless material. The fluorine fluorosulfate was synthesized as described by Dudley et al, J. Am. Chem. Soc. 1956, 78, 290. The reaction of TeF$_5$OH with either ClOSO$_2$F or ClF was used to prepare TeF$_5$OCl. Cesium and potassium chloride were oven dried, then cooled and powdered in the dry N$_2$ atmosphere of a glove box.

Infrared spectra were recorded in the range 4000–200 cm$^{-1}$ on a Perkin-Elmer Model 283 spectrophotometer calibrated by comparison with standard gas calibration points, and the reported frequencies are believed to be accurate to ±2 cm$^{-1}$. The spectra of gases were obtained using either a Teflon cell of 5-cm path length equipped with AgCl windows or a 10-cm stainless steel cell equipped with polyethylene windows which were seasoned with ClF$_3$. The spectra of matrix isolated TeF$_5$OF and TeF$_5$OCl were obtained at 6K with an Air Products Model DE202S helium refrigerator equipped with CsI windows. Research grade Ne(Matheson) was used as a matrix material in a mole ratio of 400:1.

The Raman spectra were recorded on a Cary Model 83 spectrophotometer using the 488 nm exciting line of an Ar-ion laser and a Claassen filter for the elimination of plasma lines. Quartz tubes (3 mm o.d.), closed by a metal valve, were used as sample containers in the transverse-viewing, transverse-excitation technique. A device described in Miller et al, Appl. Spectrosc. 1970, 24, 271 was used for recording the low-temperature spectra. Polarization measurements were carried out by method VIII as described by Claassen et al in J. Appl. Spectrosc. 1969, 23, 8.

From an examination of the above, it can be seen that the FOSO$_2$F is a useful reagent for the synthesis of hypofluorites. Furthermore, it is shown that TeF$_5$OF, as expected from comparison with TeF$_5$OCl, TeF$_5$OBr and FOIF$_4$O, indeed exists and is a stable molecule.

What is claimed is:

1. The compound pentafluorotellurium hypofluorite.

2. A method for synthesizing pentafluorotellurium hypofluorite which comprises the steps of:
  (a) effecting a reaction between (1) CsTeF$_5$O and (2) FOSO$_2$F at a temperature between about −45° to −10° C.;
  (b) continuing said hypofluorite reaction at said temperature for a period of time sufficient to prepare a pentafluorotellurium reaction product; and
  (c) separating said reaction product.

3. A method in accordance with claim 2 wherein said temperature is about −45° C.

4. A method in accordance with claim 2 wherein said period of time is about nine days.

* * * * *